(12) United States Patent
D'Sa et al.

(10) Patent No.: US 10,798,047 B2
(45) Date of Patent: Oct. 6, 2020

(54) SYSTEMS, DEVICES AND METHODS FOR TEXT MESSAGE COMMUNICATION

(71) Applicant: PPLCONNECT INC., Montreal (CA)

(72) Inventors: Denzil D'Sa, Montreal (CA); Sebastien Brosseau, Mont-Royal (CA); Paul Cuciureanu, Montreal (CA); Victor Parmar, Basel (CH); Jenviev Azzolin, Montreal (CA); Mathieu De Brito, Tours (FR)

(73) Assignee: PPL CONNECT INC., Montreal, Quebec (CA)

( * ) Notice: Subject to any disclaimer, the term of this patent is extended or adjusted under 35 U.S.C. 154(b) by 60 days.

(21) Appl. No.: 15/322,323

(22) PCT Filed: Jun. 26, 2015

(86) PCT No.: PCT/IB2015/054841
§ 371 (c)(1),
(2) Date: Dec. 27, 2016

(87) PCT Pub. No.: WO2015/198287
PCT Pub. Date: Dec. 30, 2015

(65) Prior Publication Data
US 2018/0212921 A1    Jul. 26, 2018

Related U.S. Application Data

(60) Provisional application No. 62/018,158, filed on Jun. 27, 2014.

(51) Int. Cl.
*H04L 12/58* (2006.01)
*G06F 16/27* (2019.01)

(52) U.S. Cl.
CPC .............. *H04L 51/38* (2013.01); *G06F 16/27* (2019.01); *H04L 51/22* (2013.01)

(58) Field of Classification Search
CPC .... G06F 17/30575; H04L 51/22; H04L 51/38
See application file for complete search history.

(56) References Cited

U.S. PATENT DOCUMENTS 8,315,616 B2 *  11/2012  Martinez ........... H04M 1/72522
                                                     455/418
2002/0065829 A1 *  5/2002  Neuhaus ............. H04L 12/4604
(Continued)

OTHER PUBLICATIONS

International Search Report; Canadian intellectual Property Office; International Application No. PCT/IB2015/054841; dated Sep. 3, 2015; 2 pages.

(Continued)

*Primary Examiner* — Mohamed A. Wasel
(74) *Attorney, Agent, or Firm* — Taft Stettinius & Hollister LLP

(57) ABSTRACT

One or more systems for text message communication including at least: a processing unit, a communication unit for transmitting and receiving data, and a storing unit, the storing unit having a first database of text messages stored thereon, the processing unit being adapted to synchronize the first database with a second database stored on a communication device so that the text message contained in a given one of the first and second databases can be copied in the other one the first and second databases in order to transmit the text message from the given one of the first and second databases to the other one the first and second databases. An electronic device for text message communication and a method for text message communication are also provided.

21 Claims, 4 Drawing Sheets

(56) References Cited

U.S. PATENT DOCUMENTS

| | | | |
|---|---|---|---|
| 2002/0099754 A1* | 7/2002 | Ueda | G06F 16/273 |
| | | | 718/1 |
| 2002/0147660 A1* | 10/2002 | Indence | G06Q 30/0601 |
| | | | 705/26.1 |
| 2004/0215669 A1* | 10/2004 | Mettala | G06F 16/273 |
| 2006/0036619 A1* | 2/2006 | Fuerst | G06Q 10/10 |
| 2007/0190978 A1* | 8/2007 | White | H04L 51/063 |
| | | | 455/412.1 |
| 2008/0189440 A1 | 8/2008 | Goyal et al. | |
| 2009/0030917 A1 | 1/2009 | Guo et al. | |
| 2011/0055154 A1* | 3/2011 | Gantaume | G06F 16/27 |
| | | | 707/623 |
| 2013/0301812 A1 | 11/2013 | Bakker Lee et al. | |
| 2014/0052793 A1 | 2/2014 | John et al. | |
| 2014/0297727 A1* | 10/2014 | Li | H04L 51/34 |
| | | | 709/203 |
| 2017/0070592 A1* | 3/2017 | Plant | H04L 51/30 |
| 2017/0139930 A1* | 5/2017 | Maloney | G06F 40/131 |

OTHER PUBLICATIONS

Written Opinion of the International Searching Authority; Canadian Intellectual Property Office; International Application No. PCT/IB2015/054841; dated Sep. 3, 2015; 5 pages.

\* cited by examiner

SYSTEMS, DEVICES AND METHODS FOR TEXT MESSAGE COMMUNICATION

CROSS-REFERENCE TO RELATED APPLICATIONS

This application is a U.S. National Phase of International PCT Application No. PCT/IB2015/054841 filed on Jun. 26, 2015, which claims the benefit of U.S. Provisional Patent Application Ser. No. 62/018,158 filed on Jun. 17, 2014, the entire contents of each application are hereby incorporated by reference.

TECHNICAL FIELD

The present invention relates to the field of telecommunication systems and method, and more particularly to methods and systems for transmitting text messages.

BACKGROUND

Currently, when a user purchases a smartphone, the operating system, phone number, and all of the smartphone functionality and content are stored locally on the smartphone and tied to the smartphone physical device. Some services are available on certain smartphones which allow a user to backup some limited content on the cloud as a means of storing data in case of an unforeseen event. These backup services, however, do not give the user complete freedom of the physical smartphone device, and rather solely provide a safety net for some historical content. These services provide partial backup of the user's information on the cloud, however the smartphone functionality remains solely available via the user's smartphone device. Thus, in order to access and use a smartphone, users must physically use the physical smartphone device. For example, usually a user may only access the messaging service of his smartphone by physically using his smartphone.

Therefore, there is a need for an improved mobile communication system.

SUMMARY

According to a first broad aspect, there is provided a system for transmitting a text message, comprising: a user device provided with a first processing unit, a first communication unit, a first storing unit, a display unit, and an input unit, the first storing unit having a first database of text messages stored thereon, the first processing unit being configured for allowing a user to at least one of receive, read, write, and send text messages; and a server provided with a second processing unit, a second communication unit, a second storing unit, the second storing unit having a second database of text messages stored thereon, wherein a given one of the first processing unit and the second processing unit is adapted to synchronize the first and second databases so that the text message contained in a given one of the first and second databases be copied in the other one the first and second databases in order to transmit the text message from the given one of the first and second databases to the other one the first and second databases.

In one embodiment, the given one of the first processing unit and the second processing unit is configured to: compare a content of the first database to a content of the second database; determine that the text message is contained in the given one of the first and second databases and absent from the other one of the first and second databases; and copy the text message to the other one of the first and second databases, in order to synchronize the first and second databases.

In one embodiment, the given one of the first processing unit and the second processing unit is the first processing unit of the user device.

In one embodiment, the server is adapted to transmit the content of the second database to the user device.

In one embodiment, the first processing unit of the user device is configured to: compare the content of the first database to the content of the second database; determine that the text message is contained in the second database and absent from the first database; and copy the text message into the first database, in order to synchronize the first and second databases.

In another embodiment, the first processing unit of the user device is configured to: compare the content of the first database to the content of the second database; determine that the text message is contained in the first database and absent from the second database; and transmit the text message to the server to be copied in the second database.

In one embodiment, the server is adapted to transmit only a part of the content of the second database to the user device.

In one embodiment, the server is adapted to transmit content of the second database that has been added or modified since a previous synchronization.

In another embodiment, the given one of the first processing unit and the second processing unit is the second processing unit of the server.

In one embodiment, the user device is adapted to transmit the content of the first database to the user device.

In one embodiment, the second processing unit of the server is configured to: compare the content of the first database to the content of the second database, determine that the text message is contained in the first database and absent from the second database; and copy the text message into the second database in order to synchronize the first and second databases.

In another embodiment, the second processing unit of the server is configured to: compare the content of the first database to the content of the second database; determine that the text message is contained in the second database and absent from the first database; and transmit the text message to the user device to be copied in the first database in order to synchronize the first and second databases.

In one embodiment, the user device is adapted to transmit only a part of the content of the first database to the server.

In one embodiment, the user device is adapted to transmit content of the first database that has been added or modified since a previous synchronization.

In one embodiment, the user device further comprises a native database of text messages, the native database being associated with a native text messaging application stored on the first storing unit, the first processing unit being further configured to synchronize the native database and the first database.

According to a second broad aspect, there is provided a device for text message communication comprising at least: a processing unit, a communication unit for transmitting and receiving data, and a storing unit, the storing unit having a first database of text messages stored thereon, the processing unit being adapted to synchronize the first database with a second database stored on a communication device so that the text message contained in a given one of the first and second databases be copied in the other one the first and second databases in order to transmit the text message from the given on of the first and second databases to the other one the first and second databases.

In one embodiment, the processing unit is adapted to: compare a content of the first database to a content of the second database; determine that the text message is contained in the given one of the first and second databases and absent from the other one of the first and second databases; and copy the text message to the other one of the first and second databases, in order to synchronize the first and second databases.

In one embodiment, the processing unit is adapted to: receive the content of the second database from the communication device; determine that the text message is contained in the second database and absent from the first database; and copy the text message into the first database in order to synchronize the first and second databases.

In another embodiment, the processing unit is adapted to: receive the content of the second database from the communication device; determine that the text message is contained in the first database and absent from the second database; and transmit to the communication device the text message to be copied into the second database in order to synchronize the first and second databases.

In one embodiment, the processing unit is adapted to periodically synchronize the first and second databases.

In one embodiment, the processing unit is adapted to receive content of the second database that has been added or modified since a previous synchronization.

In one embodiment, the processing unit, the communication unit, and the storing unit are part of a server.

In one embodiment, the processing unit, the communication unit, and the storing unit are part of a mobile device further comprising a display unit and an input unit.

According to a further broad aspect, there is provided a computer-implemented method for text message communication, the method comprising use a processing unit belonging to a device that further comprises at least a communication unit for transmitting and receiving data and a storing unit having a first database of text messages stored thereon for: synchronizing the first database with a second database of text messages stored on a communication device so that a text message contained in a given one of the first and second databases be copied in the other one the first and second databases in order to transmit the text message from the given one of the first and second databases to the other one the first and second databases.

In one embodiment, the step of synchronizing comprises: comparing a content of the first database to a content of the second database; determining that the text message is contained in the given one of the first and second databases and absent from the other one of the first and second databases; and copying the text message to the other one of the first and second databases.

In one embodiment, the step of synchronizing comprises: receiving the content of the second database from the communication device; determining that the text message is contained in the second database and absent from the first database; and copying the text message into the first database an order to synchronize the first and second databases.

In another embodiment, the step of synchronizing comprises: receiving the content of the second database from the communication device; determining that the text message is contained in the first database and absent from the second database; and transmitting to the communication device the text message to be copied into the second database in order to synchronize the first and second databases.

In one embodiment, the step of synchronizing is performed periodically.

In one embodiment, the step of receiving comprises receiving content of the second database that has been added or modified since a previous synchronization.

According to a further broad aspect, there is described a method and a system for sharing a mobile device.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Many proprietary mobile messaging platforms have sprung up in recent years. Most of them do not provide open application programming interfaces (APIs) for third party messaging integrators to connect and intemperate with, thus creating a heterogeneous communications environment where users must switch from network to network to contact other users. Classic short message service (SMS) text messages, while standardized universally across carriers, do not integrate well with the new over the top messaging applications, resulting in people having to switch back and forth between messaging providers to send text messages.

Figure 1:
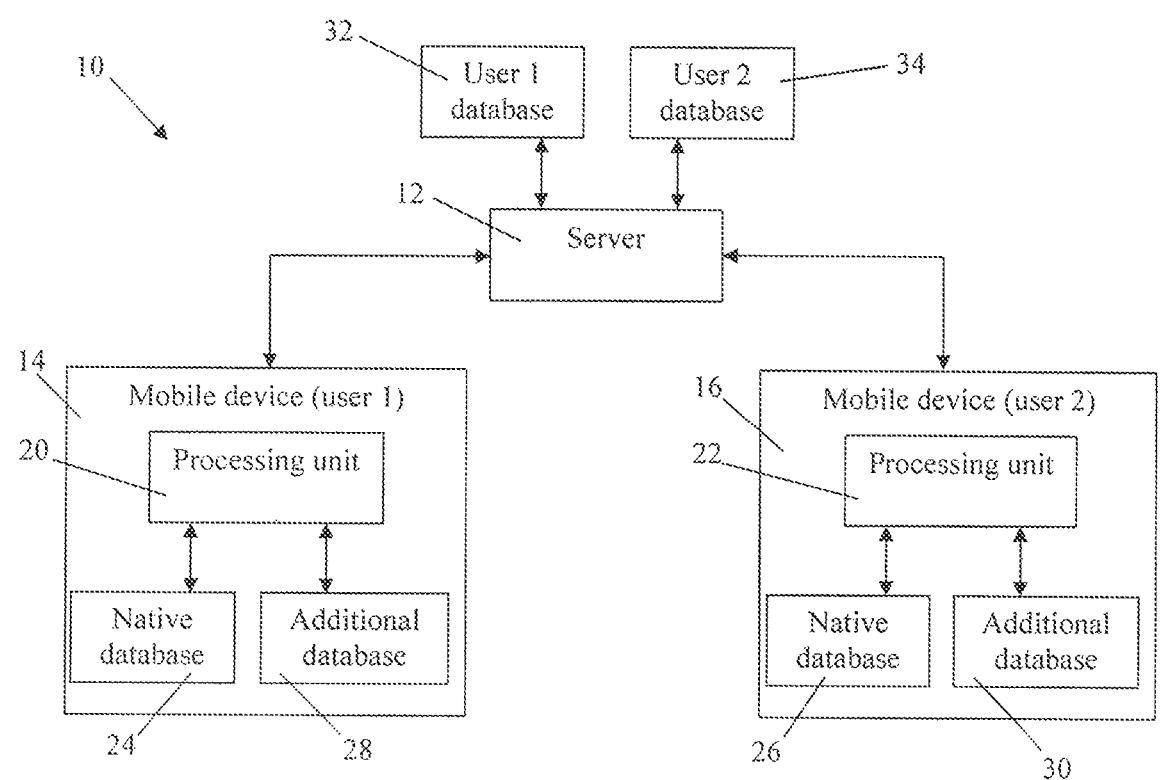
FIG. 1 is a block diagram illustrating a communication system for transmitting text messages, in accordance with an embodiment.

FIG. 1 illustrates one embodiment of a system 10 for sending text messages between users of the system 10. A text message is an electronic message comprising words, symbols and/or numbers. A text message is usually adapted to be sent over a wireless network from one mobile device to another. In one embodiment, the number of characters contained in the text message may be limited to a maximal predetermined number. For example, a text message may be limited to about 140 characters. Examples of text messages comprise SMS messages, BlackBerry™ Messenger (BBM) messages, Whatsapp™ messages, or the like. The system 10 comprises a server 12 and at least two user mobile devices 14 and 16. The user mobile devices 14 and 16 are in communication with the server 12. A mobile device is a device provided with mobile communication capabilities. A mobile device is adapted to receive and send text messages. Examples of mobile devices comprise cell phones, smartphones, tablets, computers, laptops, or the like.

In one embodiment, the server 12 and at least one of the user mobile devices 14 and 16 may communicate together via wireless communications.

Each user mobile device 14, 16 comprises a processing unit 20, 22, an input device (not shown), a display unit (not shown), a storing unit (not shown), and a communication unit. The input device may be a physical device such as a physical keyboard through which a user may write a text message. In another embodiment, the input device may be a virtual keyboard to be displayed on the display unit. In this case, the display unit may be a touch screen. It should be understood that any adequate input device allowing a user to input data may be used such as a voice input device, a vision-impaired input device, or the like. The communication unit may allow for data communication and mobile communication.

For example, the communication unit may allow for Wi-Fi communications, Global System for Mobile Communications (GSM), third generation (3G) communications, fourth generation (4G) communications, long term communications (LTE), and/or the like.

The storing unit comprises a native text messaging application stored thereon. The native text messaging application is referred to as the native application hereinafter. In one embodiment, the native application is a text messaging application that is installed on the user mobile device before the purchase of the user mobile device. For example, the native application may be an application that allows a user to read, write, and send SMS messages. In another embodiment, the native application may a text messaging application that was not installed on the user mobile device while the user purchased the user mobile device but was subsequently installed on the user mobile device by the user. The user then identifies the installed text messaging application as being the native application.

In one embodiment, the native application is the primary text messaging application used by the user to send text messages. The native application is the default messaging tool that a user actions for sending and receiving text messages within the smartphone operating system environment.

The storing unit further comprises an additional text messaging application stored thereon, such as a third party text messaging application.

In one embodiment, the additional application comprises no interface so that a user may only read or write a text message via the interface of the native application. In this case, the additional application uses the interface of the native application to provide the use with an access to the text messages.

In another embodiment, the additional application is provided with an interface so that a user may read, write, and send text messages via the interface of the additional application. In this case, the additional application may be considered as a secondary application that may be used by the user for reading, writing, and sending text messages.

The storing twit of each user mobile device 14, 16 comprises a native database 24, 26, and an additional database 28, 30. The native database comprises at least the text messages that were either sent by the user (outgoing text messages) or received by the user (incoming text messages), and information relative to the text messages such as the date and time at which each text message has been sent or received, the phone number and/or the name of the contact to which a text message is sent, the phone number and/or the name of the contact from which a text message is received, and/or the like. In one embodiment, the native database further comprises a list of contacts and their respective phone number(s).

The additional database comprises at least some of the information contained in the native database. As described below, the additional database and the native databases are synchronized together so that any changes/modifications made to given one of the two databases is reflected into the other database. A change/modification to a database may correspond to the addition or deletion of a text message in the database, the addition or deletion of a contact, the modification of a text message, the modification of a contact, or the like.

The additional application comprises statements and instructions that are stored in the storing unit of the user mobile device 14, 16. Upon execution of the statements and instructions by the processing unit 20, 22 the processing unit 20, 22 is configured for synchronizing at least one of the native database 24, 26 and the additional database 28, 30, respectively, with the other database. For example, the processing unit 20, 22 may be configured to synchronize the additional database with the native database so that any changes to the native database be reflected in the additional database while changes to the additional database are not reflected in the native database. In another example, the processing unit 20, 22 may be configured to synchronize the native database with the additional database so that any changes to the additional database be reflected in the native database while changes to the native database are not reflected in the additional database. In a further example, the processing unit 20, 22 may be adapted to synchronize together the native and additional databases so that both databases contain substantially the same information. The processing unit 20, 22 is adapted to compare the content of the additional database 28, 30 to that of the native database 24, 26, and determine any differences between the content of the native database and that of the additional database. If at least one difference exists between the two databases, the processing unit 20, 22 is configured to modify the content of at least one of the two databases to correct the content difference. If a new text message exists in the native database 24, 26 and is not contained in the additional database 28, 30, then the processing unit 20, 22 is adapted to insert a copy of the now text message in the additional database 28, 20. In one embodiment, if a new text message exists in the additional database 28, 30 and is not contained in the native database 24, 26, then the processing unit 20, 22 is adapted to insert a copy of the new text message in the native database 24, 26. In one embodiment, the insertion of a given message to a database also comprises the insertion of the message information associated to the given message, such as the name or phone number of the recipient the name or phone number of the sender, the time at which the given message has been sent or received, and/or the like. In one embodiment, the processing unit 20, 22 is adapted to observe for new events, i.e., triggers, that occur in the native database 24, 26. Whenever a new event or trigger is detected, e.g. an addition or a deletion of data, the processing unit 20, 22 triggers a synchronization between the native database 24, 26 and the additional database 28, 30. Also if a new message is coming from the additional database 28, 30, the processing unit 20, 22 knows that this is an insertion into the native database 24, 26 and not a message that was removed from the native database 24, 26 as the change trigger is coming from the additional database 28, 30 and not the native database 24, 26. In one embodiment, a trigger coming from the native database 24, 26 can be ignored.

In one embodiment, the following information is associated with each text message in each database; text message ID, indication as to whether the text message is an incoming message or an outgoing message, the phone number from which the message is received or to which the message is to be sent, the name of the contact from which the text message is received or to which the message is transmitted, the time and date at which the message is received or transmitted, and/or the like.

In one embodiment, the processing unit 20, 22 is adapted to substantially periodically synchronize together the native database 24, 26 and the additional database 28, 30. In this case, the processing unit 20, 22 compares the additional database 28, 30 to the native database 24, 26 at substantially equal time intervals, and inserts and/or deletes content in at least one of the two databases so that the additional database 28, 30 substantially corresponds to the native database 24, 26, and/or vice versa.

In another embodiment, the additional application comprises statements and instructions that, when executed by the processing unit 20, 22, allow the processing unit to observe the content of the native database 24, 26 and that of the additional database 28, 30, and determine when a change or modification in the content of a database is made. In one embodiment, upon detection of a change in the content of the native database 24, 26 and/or the additional database 28, 30, the processing unit 20, 22 synchronizes together the native database 24, 26 and the additional database 28, 30 so that their content be substantially similar. In another embodiment, the processing unit 20, 22 is adapted to only synchronize changes in the content of the native database 24, 26 to the additional database 28, 30, but does not synchronize changes in the content of the additional database 28, 30 to the native database 24, 26.

In one embodiment, the processing unit 20, 22 is adapted to observe the content of the native database 24, 26 and/or that of the additional database 28, 30 substantially continuously. In another embodiment, the processing unit 20, 22 is adapted to periodically observe the content of the native database 24, 26 and/or that of the additional database 28, 30.

Referring back to FIG. 1, the user mobile devices 14 and 16 are in communication with the server 12. The server 12 comprises a processing unit (not shown), a storing unit (not shown) for storing data, a communication unit (not shown) for receiving and transmitting data. In one embodiment, the server 12 comprises an application programming interface (API)/awaits connections so that the user device 14, 16 may synchronize. The user mobile devices 14 and 16 and the server 12 communicate via database synchronization so that any changes made to the information contained in the additional database 28, 30 be reflected in a respective user database on the server 12, and vice-versa.

In one embodiment, the server 12 is in charge of the database synchronization. In this case, the server 12 is adapted to compare the content of the user database stored thereon to the content of the additional database and determine any differences between the content of the two databases. The server 12 may then update the content of at least one database so that the two databases contain substantially the same information. In one embodiment, the server 12 sends a notice to the mobile device 14, 16 which, upon reception of the notice, sends at least part of the content of its additional database to the server 12. In one embodiment, the mobile device 14, 16 transmits the whole content of its additional database to the server 12. The server 12 then compares the whole content of the additional database to the content of the user database stored an the server 12. If differences such as new content or content modifications exist between the two databases, then the server 12 updates the content of at least of the two databases so that they contain substantially the same content. For example, if the additional database contains a sent text message that is not present in the user database, then the server 12 stores a copy of the sent text message in the user database, including the information associated with the text message such as an indication as to whether the text message is an incoming or outgoing message, the text message ID, and/or the like. It should also be understood that the server 12 further transmits the text message to the recipient using database synchronization or using a cellular SMS network. If the user database stored on the server 12 contains a given received text message that is not present in the additional database, then the server 12 sends the given received text message to the mobile device 14, 16 which stores it in the additional database.

In another example, the mobile device 14, 16 is adapted to transmit only part of the content of the additional database to the server 12. For example, the mobile device 14, 16 may transmit only new content that has been added to the additional database for a given period of time and content that has been modified or deleted during the last period of time. For example, the last period of time may correspond to the time elapsed since the last synchronization with the server 12. The server then compares the received content to the content of its user database that has been added or modified during the last period of time. In one embodiment, the mobile device 14, 16 transmits the given period of time to the server 12. In another embodiment, no time indication is sent to the server 12. For example, both the mobile device 14, 16 and the server 12 keep in memory the different synchronization times. In this case, they are adapted to determine the time at which the last synchronization occurred and also determine the content that has been added, modified, or deleted in their respective database since the last synchronization.

The server 12 may be configured to process synchronization requests from the user device 14, 16, accordingly update the server database, and send relevant server updated data back to the user device 14, 16. For each user, a user database 32, 34 is created and stored on the storing unit. In one embodiment, all user data is stored in a single database stored on the storing unit. User data may be separated by using a unique identification (ID) per user so that a user's set of data that needs to be synched to his additional database may be grabbed. For each user, the processing unit of the server 12 is configured for synchronizing together the user database 32, 34 and the corresponding additional database 28, 30, respectively, stored on the user mobile device 14, 16, respectively. Therefore, if a change in the content of the additional database 28, 30 occurs, the same change is made to the content of the user database 32, 34 stored op the server 12. Similarly, if a change in the content of the user database 32, 34 occurs, the same change is made in the content of the additional database 28, 30, respectively, on the user mobile device 14, 16, respectively. In one embodiment, since the processing unit 20, 22 of the user mobile device 14, 16 is adapted to synchronize together the native database 24, 26 and the additional database 28, 30, the change in the content of the user database 32, 34 stored in the server 12 is reflected in the native database 24, 26 on the user mobile device 14, 16.

In one embodiment, the processing unit of the server 12 is adapted to periodically synchronize the user database 32, 34 stored on the server 12 and the additional database 28, 30 stored on the user mobile device 14, 16. In this case, the server 12 may not send any notice to the mobile device 14, 16 in order to start the database synchronization. Since the synchronization is periodical, the mobile device 14, 16 knowns at which predetermined times it has to send its content to the server 12.

In another embodiment, the processing unit of the server 12 is adapted to observe the content of the user database 32, 34 and triggers a synchronization between the user database 32, 34 and the additional database 28, 30 each time a modification to the content of the user database 32, 34 occurs. A synchronization may be triggered by having the server 12 sending a notification indicative that some data has to be synchronized to the user device 14, 16. Upon reception of the notification, the user device 14, 16 synchronizes with the server 12.

In one embodiment, the processing unit 20, 22 of the user mobile device 14, 16 is adapted to send a notification to the server 12 each time a modification to the content of the additional database 28, 30 occurs. Upon receipt of the notification by the server 12, the processing unit of the server 12 triggers a synchronization between the user database 32, 34 and the additional database 28, 30.

In one embodiment, any modification to the native or additional database detected by the processing unit 20, 22 triggers a synchronization with the user database stored on the server 12. In one embodiment, upon detection of any modification to the additional database, the processing unit 20, 22 sends a notification to the server 12. Upon reception of the notification, the server 12 may synchronize substantially immediately the user database with the additional database. Alternatively, the server 12 may wait for a next scheduled synchronization in order to synchronize the user database with the additional database. The server 12 then sends a notification to the user device 14, 16 which triggers the synchronization between the additional database and the user database.

In one embodiment, the processing unit of the server 12 is configured to observe the user databases 32, 34 and trigger a synchronization upon detection of a change in a given user database 32, 34 by sending a notification to the user device 14, 16, as described below.

While in the above description the server 12 is in charge of the database synchronization, it should be understood that the mobile device 14, 16 may be in charge of the database synchronization instead of the server 12 or in addition to the server 12. When the database synchronization is performed only by the mobile device 14, 16, the mobile device 14, 16 is adapted to trigger the synchronization. For example, the mobile device 14, 16 may send a notice to the server 12 and, upon reception of the notice, the server transmits at least part of the information contained in the user database to the mobile device 14, 16. The mobile device 14, 16 receives and compares the information contained in the user database to the information contained in the additional database. If no difference exists between the user database and the additional database, then the synchronization stops, it it determines at least one difference between the content of the user database and that of the additional database, the mobile device 14, 16 updates the content of at least one of the two databases so that both databases contain substantially the same information. For example, if it determines that an incoming text message is contained in the user database but not in the additional database, the mobile device 14, 16 stores a copy of the incoming text message and its associated information in the additional database. In another example, if it determines that an outgoing text message is contained in the additional database but not in the user database, the mobile device 14, 16 transmits the identified outgoing text message to the server 12 which stores it in the user database. It should be understood that the server 12 may send only part of the content of the user database to the mobile device 14, 16 for synchronization purposes. As described above, only the content of the user database that has been added or modified for a predetermined period of time may be sent to the mobile device 14, 16. In another example, only the content of the user database that has been added or modified since the last synchronization may be sent to the mobile device 14, 16.

In one embodiment, the additional application may be selected by the user as being the primary application. In this case, the additional application substitutes the native application which is bypassed, and the user uses the interface of the additional application to access, read, write, and/or send text messages, in an embodiment in which the additional application is selected as being the primary application, the only synchronization to occur is between the user database 32, 34 and the additional database 28, 30 in order to transmit text messages from the user database 32, 34 to the additional database 28, 30, or from the additional database 28, 30 to the user database 32, 34. In one embodiment, there is no synchronization between the native database and the additional database so that no text messages be stored in the native database. In another embodiment, the synchronization between the additional database 28, 30 and the native database 24, 26 occurs even if the additional application is selected as being the primary application.

In order to transmit an outgoing text message from the mobile device 14 to the mobile device 16, a first synchronization occurs between the additional database 28 of the mobile device 14 and the user database 32 of the server 12. Then a second synchronization occurs between the user database 32 and the user database 34 in order to copy the outgoing text message as an incoming text message into the user database 34 of the second user. A third synchronization occurs between the user database 34 and the additional database 30 in order to transmit the incoming text message to the mobile device 16 of the second user.

While the above description refers to a single server 12, it should be understood that a plurality of servers may be used to transmit text messages between the mobile device 14 and the mobile device 16. In this ease, a user database for each user may be stored on each server and the text messages are transmitted from one server to another using the above-described method of database synchronization between a mobile device 14, 16 and the server 12.

Figure 2:
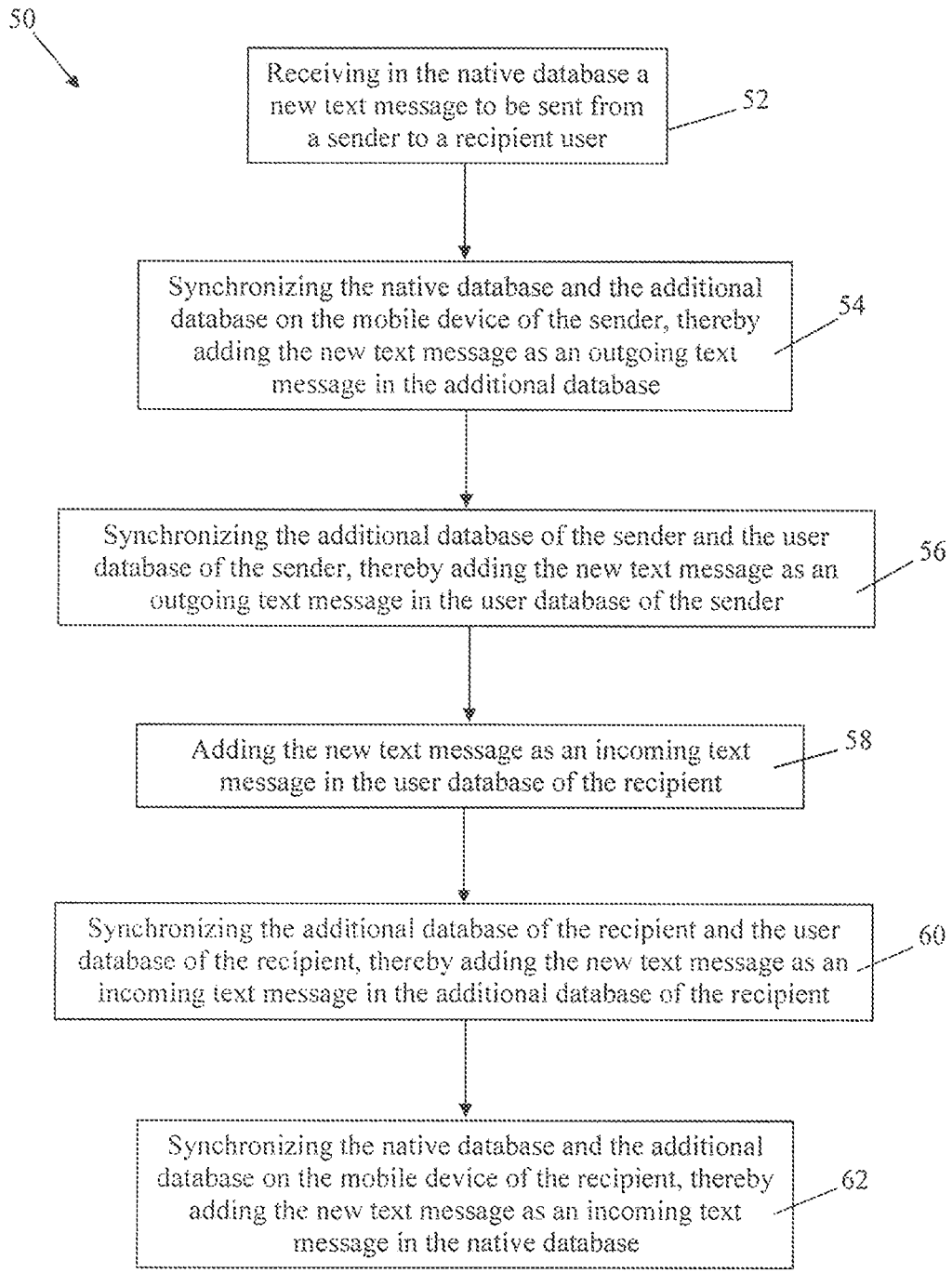
FIG. 2 is a flow chart illustrating a method for transmitting a text message, in accordance with an embodiment.

FIG. 2 illustrates one embodiment of a method 50 for sending a text message using the above-described system 10. A first user, i.e., the sender, uses his user mobile device 14 to create and send a text message. The sender opens his native application, selects a recipient to which the text message is to be sent, and writes the message to be sent as a text message. The user then selects to send the written message by clicking on a "send" icon, button, or the like displayed on the touch screen of the user mobile device 14 or depressing an "enter" key on the keyboard of the user mobile device 14 for example.

In an embodiment in which the additional application is provided with a user interface, the user may open the additional application, selects a recipient to which the text message is to be sent, and writes the message to be sent as a text message. The user then selects to send the written message by clicking on a "send" icon, button, or the like displayed on the touch screen of the user mobile device 14 or depressing an "enter" key on the keyboard of the user mobile device 14 for example.

However, the processing unit 20 of the user mobile device 4 does not actually send the text message to the recipient using a cellular SMS network, but saves the written text message in the native database 24 and/or the additional database 28 at step 52. An identification of the recipient such as the phone number of the recipient, and optionally the time and date at which the message has been written are saved in the native database 24 and/or the additional database 28 along with the written text message. In one embodiment, the text message is first saved in the additional database 28 as an outgoing text message, and subsequently saved in the native database 24 also as an outgoing text message. In this case, while synchronizing together the native and additional database 24 and 28, the processing unit 20 determines that the sent text message is already inserted into the native database 24 and therefore does not add it to the native database 24.

At step 54, the processing unit 20 of the user mobile device 14 synchronizes together the native database and the additional database 28. If it determines that a new message is contained in one database but not in the other, the processing unit 20 adds the sent text message in the other database via synchronization. As a result of the synchronization, the new text message is saved as an outgoing text message into the other database. It should be understood that the identification of the recipient is also stored in the additional database 28 along with the new text message. If it determines that the sent text message already exists in the native and additional database 24 and 28, the processing unit 20 does not add the sent text message to any of the databases 24 and 28.

In one embodiment, the processing unit 20 of the user mobile device 14 interprets the command to send the written message received from the user as a notification to synchronize the two databases 24 and 28. After writing his message, the user selects to send the message by touching a "send" icon or depressing an "enter" key for example. A command indicating to send the message is sent to the processing unit 20 of the user mobile device 14. However, the processing unit 20 does not send the message but stores it in the native database 24 and interprets the command as a notification for triggering the synchronization between the native database 24 and the additional database 28.

In another embodiment, the input of the send command from the user triggers no action from the processing unit 20. For example, the processing unit 20 may be adapted to synchronize the databases 24 ad 28 periodically. In another example, the processing unit 20 may be adapted to observe the content of the native database 24 and to synchronize the additional database 28 with the native database 24 when a modification to the content of the native database 24 is detected, as described above.

In an embodiment in which the additional application is the primary application, the sent message may not be saved in the native database.

At step 56, the processing unit of the server 12 synchronizes the user database 32 of the sender stored in the server 12 with the additional database 28 stored on the sender mobile device 14. By comparing the content of the user database 32 to that of the additional database 28, the processing unit of the server 12 or the processing unit of the user device 14 determines that a new message exists in the additional database 32 but is not present in the user database 32 of the sender. Therefore, the processing unit of the server 12 uploads the new text message along with at least the identification of the recipient for the new text message and saves it as an outgoing text message in the user database 32 of the sender.

At step 58, the processing unit of the server 12 identifies the user database 34 of the recipient using the received identification of the recipient for the new text message and saves the new text message as an incoming text message in the user database 34 of the recipient. It should be understood that an identification of the sender is also stored in the user database 34 along with the new message.

At step 60, the processing unit of the server 12 synchronizes together the user database 34 of the recipient and the additional database 26 stored on the user mobile device 16 of the recipient. The processing unit of the server 12 compares the content of the user database 34 to that of the additional database 30 and determines that a new incoming message is contained in the user database 34 but not in the additional database 30. The new incoming message is then transmitted by the server 12 to the user mobile device 16 of the recipient along with the identification of the sender. The processing unit 22 of the recipient mobile device 16 stores the received text message as an incoming text message in the additional database 30 along with the identification of the sender. In another embodiment, the synchronization between the user database 34 of the recipient and the additional database 26 stored on the user mobile device 16 is performed by the processing unit 22 of the recipient mobile device 16. In this case, the processing unit 22 compares the content of the user database 34 to that of the additional database 30 and determines that a new incoming text message is contained in the user database 34 but not in the additional database 30. The server 12 then transmits the new incoming message to the recipient mobile device and the processing unit 22 stored the received text message in the additional database 30 as an incoming message.

In one embodiment, upon reception of the new text message, the processing unit 22 may store the new text message as an incoming text message in both the additional database 30 and the native database 26.

In one embodiment, the saving of the new text message in the user database 34 of the recipient triggers a notification for a synchronization between the user database 34 and the additional database 30. As a result, as soon the new text message is saved in the recipient database 34, the processing unit of the server 12 triggers a synchronization between the recipient database 34 stored on the server 12 and the additional database 30 stored on the recipient mobile device 16.

In another embodiment, the saving of the new text message in the user database 34 of the recipient triggers no direct action for the processing unit of the server 12. For example, the synchronization may occur subsequently after the saving of the text message in the user database 34 during a periodical synchronization. In another example, the processing unit of the server 12 may be configured for observing the content of the recipient database 34. Upon detection of a modification of the content of the recipient database 34 such as the addition or the new incoming message, the processing unit triggers a synchronization between the recipient database 34 and the additional database 30 stored on the recipient mobile device 16.

At step 62, the processing unit 22 synchronizes together the additional database 30 and the native database 26 of the recipient mobile device 16. The processing unit 22 is configured for comparing the content of the native database 26 to that of the additional database 30. The processing unit 22 determines that the newly received message is contained in the additional database 30 but not in the native database 26, and then saves a copy of the new text message as an incoming message in the native database 26 along with the identification of the sender. In an embodiment in which it saves any text messages received from the server 12 in both the additional database 30 and the native database 26, the processing unit 22 determines during the synchronization of step 62 that the received message already exists in the native database 26 and therefore does not save it in the native database 26.

In one embodiment, the saving of the received incoming text message in the additional database 30 triggers a notification indicating that a modification to the content of the additional database 30 occurred. As a result, after saving the received message in the additional database 30, the processing unit triggers a synchronization between the additional database 30 and the native database 26.

In another embodiment, the saving of the new text message in the additional database 30 triggers no direct action for the processing unit 22. For example, the processing unit 22 may be configured to periodically synchronize together the native database 26 and the additional database 30. In this case, the new text message is saved in the native database 26 as an incoming text message during the next periodical synchronization. In another example, the processing unit is adapted to observe the additional database 30 and detect any modification that may occur in the content thereof. In this case and after the saving of the new text message in the additional database 30, the processing unit determines that the new text message has been saved in the additional database 30 and saves a copy of the new text message as an incoming message in the native database 26.

Once the new message has been saved in the native database 30 of the recipient mobile device 16, the recipient may access the new text message by opening the native text application which provides the recipient with an access to the content of the native database 30.

While in the above description the user mobile devices 14 and 16 are referred to as being the sender mobile device and the recipient mobile device, respectively, it should be understood that the user mobile device 16 may be the recipient mobile device and the user mobile device 14 may be the sender mobile device so that a text message may be sent from the user mobile device 16 to the user mobile device 14 using the above-described method of database synchronization.

It should be understood that the native database ma comprise information about contacts and/or call logs. In this case, the above synchronization method between the native and additional databases and the user and additional database may be used for updating the information about the contact and/or the call logs. For example, if a user adds a new contact in the native database through the native application, the information about the new contact is also stored in the additional database on the user mobile device and in the user database on the server using the local synchronization, i.e. the synchronization between the native database and the additional database, and the system synchronization, i.e. the synchronization between the additional database on the user mobile device and user database on the server.

In one embodiment, when it detects a modification to the content of the additional database 28, 30, the processing unit 20, 22 sends a notification for synchronization to the server 12. Upon reception of the notification, the processing unit of the server 12 synchronizes the user database 32, 34 with the additional database 28, 30.

In the same or another embodiment, when it detects a modification to the content of the user database 32, 34, the processing unit of the server 12 sends a notification for synchronization to the user mobile device 14, 16, respectively. Upon reception of the notification, the processing unit 20, 22 synchronizes the additional database 28, 30, respectively, with the user database 32, 34, respectively.

In one embodiment, the notification comprises a text message such as a SMS message.

In one embodiment of the method 50, the steps 58-62 may be omitted. In this case, the server 12 is adapted to transmit the text message sent by the mobile device 12 to the mobile device 14 using a usual cellular SMS network. For example, this method may be used when the server 12 comprises no user database for the second user or when there is no data connection between the server 12 and the mobile device 16.

In one embodiment, the server 12 may be accessed by any adequate secondary device such a personal computer, a tablet, a laptop, or the like. As a result, the user may have access to the text messaging service of his mobile device via another device, i.e. the secondary device. The adequate secondary device may be any device connectable to the Internet such as a tablet, a personal computer, a laptop, or the like. For example, a user may connect to the server 12 from a laptop using an Internet connection. Once connected to the server 12, the user may access the content of his user database stored on the server 12. It should be understood that the secondary device may also be a mobile device.

In one embodiment, the server 12 may be adapted to provide the user with an interface through which he may directly modify the content of his user database stored on the server. For example, through the interface, the user may read, write, and delete text messages. He may also access and modify contact information and access calls log history. Thereby, the user is able to use the text messaging functionality his mobile device such as his smartphone from another device while not physically using his mobile device.

In one embodiment, the sender mobile device is not provided with the additional application. In this case, the sender sends a text message to the recipient using a usual mobile network. The sent text message is received by the server 12 which transmits the text message to the recipient mobile device using database synchronization.

In another embodiment, the recipient mobile device is not provided with the additional application. In this case, the sender sends a text message which is transmitted to the server 12 via database synchronization. In one embodiment, the server 12 then transmits the text message to the recipient mobile device using a usual mobile network, in another embodiment, the server 12 determines that the recipient does not have the additional application and sends a notification to the sender mobile device. Upon reception of the notification, the sender mobile device then sends the text message to the recipient using a usual mobile network. The same procedure, i.e. having the server 12 sending the text message using a usual mobile network, may be applied under different circumstances such as when the server 12 determines that the battery of the recipient mobile device is dead for example.

In another embodiment, an application or software such as a web client application is installed on the user non-mobile device. Upon connection to the server, a database, referred to as the local database hereinafter, is created on a storing unit such as the storing unit of the non-mobile device and the processing unit of the non-mobile device is configured for synchronizing the local database of the non-mobile device with the user database stored on the server using the above-described method. In one embodiment, the processing unit of the server is adapted to send a notification via the Internet connection to the non-mobile device each time a change to the content of the user database is detected. Upon reception of the notification, the processing unit of the non-mobile device synchronizes the local database with the user database stored on the server.

In one embodiment, the user mobile device may receive and transmit information via a mobile connection and a data connection. When using the data connection, the user mobile device receives and transmits information via a mobile network. The mobile connection is usually used for phone calls and text messaging such as SMS messaging.

The data connection may be of two types: the mobile data connection and the Wi-Fi connection.

In one embodiment, the processing unit 20, 22 of the user mobile device 14, 16 is configured for determining the connections that are available before sending a text message. If no data connection is available or the user mobile device is not connected to a data connection, then the processing unit 20, 22 sends the text message using the mobile connection via the mobile network using the usual transmission method. Furthermore, the processing unit 20, 22 synchronizes the additional database 28, 30 with the native database 24, 26. However, the synchronization between the additional database 28, 30 and the user database 32, 34 is delayed until the user mobile device 14, 16 be connected to a data connection. Upon connection to a data connection such as a mobile data connection or a Wi-Fi connection, the additional database 28, 30 and the user database 32, 34 are synchronized together. In one embodiment, the synchronization between the additional database 26, 30 and the user database 32, 34 only occurs when the user mobile device 14, 16 is connected to the server 12 via a Wi-Fi connection. In one embodiment, the synchronization occurs as soon as the connection is established. In another embodiment, the periodicity of synchronization is respected and the synchronization only happens once the time period for synchronization has passed/arrived.

If the user mobile device 14, 16 is connected to a data connection and the recipient user mobile device is provided with the additional application, then no text message is sent via the mobile network. The text message is sent via the mobile data connection or the Wi-Fi connection using the above-described synchronization method. Thereby, no text message such as an SMS message is sent. Instead the text message is sent using data. As a result, the SMS plan of the user is not affected by the transmission of the text message. In addition, if the text message is sent by synchronization via a Wi-Fi connection no data from the data plan of the user is consumed.

In one embodiment, if both a Wi-Fi connection and a mobile data connection are available, the transmission of the text message is performed by the processing unit 20, 22 using the Wi-Fi connection.

In one embodiment, the processing unit of the server 12 is adapted to determine whether the user mobile device 14, 16 is connected thereto via a mobile data connection and/or a Wi-Fi connection. If a text message is sent to a given recipient and the processing unit of the server 12 determines that the recipient user mobile device is not connected thereto via a data connection, then the processing unit of the server 12 sends the text message via the mobile network using the usual method. If it determines that a data connection exists between the server 12 and the recipient mobile device, then the processing unit of the server transmits the text message to the user mobile device using the above-described synchronization method, in this case, no text message such as SMS text message is used from the SMS operator plan of the user for transmitting the text message.

In one embodiment, if both a mobile data connection and a Wi-Fi connection exist between the server 12 and the user mobile device, the processing unit of the server 12 transmits the text message using me Wi-Fi connection so that no data is consumed form the user data plan while transmitting the text message.

In one embodiment, some modifications made by the user to the user database stored on the server 12 or to the native and/or additional database are transmitted to the other databases only when a data connection is available. For example, if the user deletes a contact from his native database, the modification to the native database is reflected in the additional database. However, this modification is reflected in the user database stored on the server 12 only when a data connection is available for the user mobile device i.e. the synchronization between the additional database stored on the user mobile device and the user database stored on the server only occurs when the user mobile device is connected to the server via a data connection. In one embodiment, the synchronization between the user and additional databases for reflecting the deletion of a contact only occurs when a Wi-Fi connection is available between the user mobile device and the server 12.

In another example, a user may access his user database stored on the server via a laptop and delete a contact. The deletion of the contact may be reflected in the native database of the user mobile device only when the user mobile device is connected to the server 12 via a data connection. In one embodiment, the synchronization between the user database stored on the server and the additional database stored on the user mobile device only occurs when a Wi-Fi connection exists between the user mobile device and the server.

While the present description refers to a single server 12, it should be understood that more than one server may be used for transmitting text messages between the user mobile devices 14 and 16. For example, a farm of server may be used for hosting the user databases 32 and 34, and transmit the text messages between the user mobile devices 14 and 16. In another example, the user databases 32 and 34 may be stored in the cloud and the text messages exchanged between users are transmitted via the cloud.

In the following, there is described a method of sharing a mobile device while using the above-described method and system. This method is referred to as Hotel my phone™. The method allows a given user to safely and securely temporarily use someone else's mobile device without compromising the privacy and/or the security of personal data on the host mobile device.

Smartphone users often share their mobile devices with friends for brief periods of time, usually while in the company of the owner of the device. In some non-western cultures, such as in India, people often share a device between several users for extended periods of time. Unfortunately, the current security paradigm employed by most of mobile operating systems does not allow for easy sharing of devices. Google™ has attempted implementing user profiles targeting the use-case of parents handing over their tablet or smartphone devices to their children to play mobile games. While this solves the problem of not accessing the main user's data while temporarily logged in to the device, it requires an involved setup process to make it work.

Figure 3:
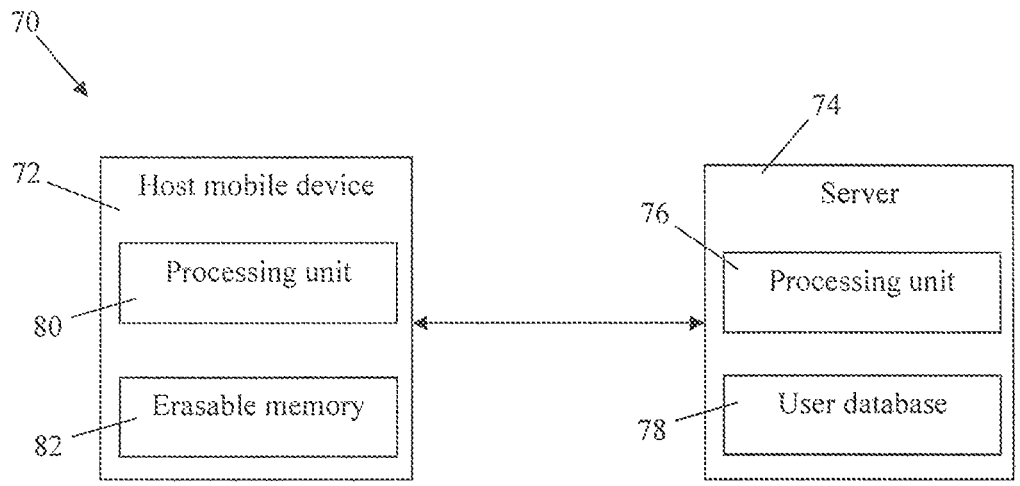
FIG. 3 is a block diagram illustrating a system for sharing a mobile device, in accordance with an embodiment.

FIG. 3 illustrates one embodiment of a system 70 for sharing a mobile device, i.e. the host mobile device 72. The system 70 comprises a server 74 that is in communication with the host mobile device 72. The system 70 allows a guest user having a mobile derive (not shown) to which a phone number is associated to use the mobile device of another user/person, i.e. the host mobile device 72 to which another and different phone number is associated. While using the host mobile device 72, the guest user is able to communicate with people just as if he would use his own mobile device. For example, the guest user may call a contact or send a text message to a contact and the phone number appearing on the contact mobile device is the phone number of the guest user even if the call has been initiated from the host mobile device or the text message has been sent from the host mobile device. The server 74 is configured to transmit all communications directed to the guest user phone number to the host mobile device 72. For example, if a contact calls the guest user or sends a text message to the guest user using the phone number of the guest user phone number, the server 74 is adapted to transmit the call or the text message to the host mobile device 72 even though the call or text message is directed to the guest mobile device.

In order to minimally affect the operator plan of the guest user, communications using a mobile communication network are avoided when possible. For example, Voice over IP (VoIP) is used for phone calls and text messages are sent and received using the above-described synchronization method. Doing so, the voice call plan and the SMS message plan of the owner of the host mobile device 72 are not affected by the use of the host mobile device 74 by the guest user. Therefore, only the data plan of the owner of the host mobile device is affected by the use of the host mobile device 72. In order not to affect the data plan of the owner of the host mobile device 72, a Wi-Fi connection may be used for the phone call and text message communications.

In one embodiment, the guest user may only use the host mobile device for a predetermined period of time.

Referring back to FIG. 3, the server 74 is provided at least with communication means (not shown), a processing unit 76, and a user database 78 stored on a memory. The user database comprises information about the guest user, i.e. the guest account data. The guest account data comprise at least the phone number associated with the guest mobile device, identification information, and communication data. The communication data comprise contact information data, text message information data, phone call information data, and/or the like. The contact information data comprise data about the contacts or the guest user such as a list of contact names, their respective phone number, and the like. The text message information data comprise data about previous text messages sent and received by the guest user. The phone call information data comprise data about previous phone call received or passed by the guest user.

The host mobile device 72 is provided at least with a processing unit 80, an input unit (not shown), communication means (not shown), and an erasable memory 82. The host mobile device 72 is adapted to receive guest account data from the server 74 and locally store the pest account data in an erasable manner so that all guest account data be erased once the guest user logs off.

Figure 4:
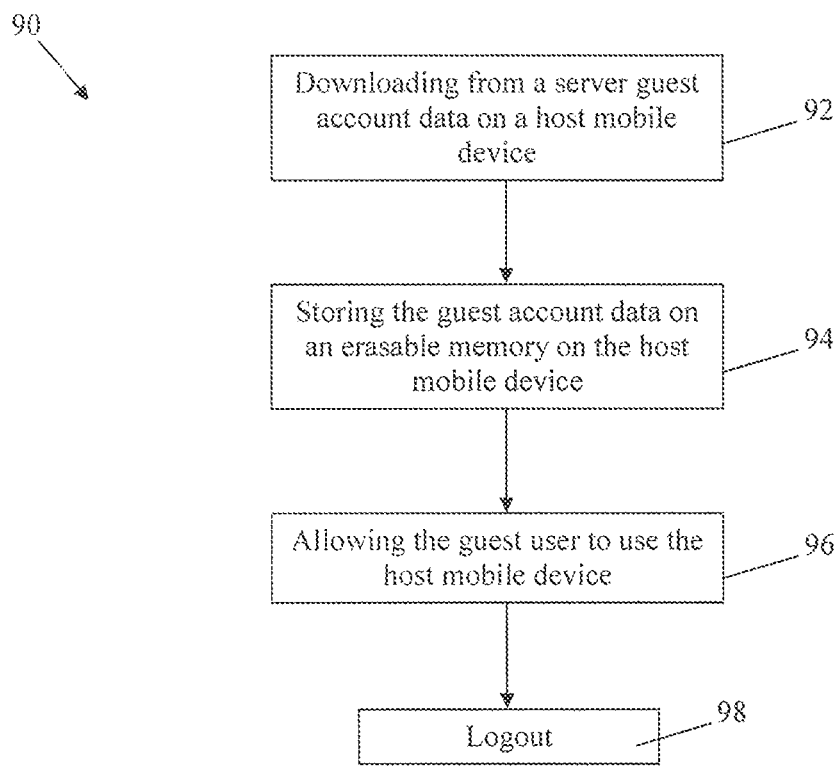
FIG. 4 is a flow chart illustrating a method for sharing a mobile device, in accordance with an embodiment.

FIG. 4 illustrates one embodiment of a method 80 for allowing the guest user to use the host mobile device 72. The guest user starts by connecting to the server 74 using the host mobile device 72. For example, the guest user may use the web browser of the host mobile device 72 to connect to the server 74. In another example, an application such as the above-described additional application may be installed on the host mobile device 72 and the guest user may connect to the server 74 via the application.

Once connected to the server 74, the guest user inputs identification information such as a username and a password and the host mobile device 72 transmits the identification information to the server 74. The processing unit 76 of the server 74 verifies the received identification information, and upon successful verification, identifies account data stored in the database 76 that corresponds to the guest identification information, and provides recess to the host mobile device 72. The processing unit 76 of the server 74 further stores in memory the phone number associated with the host mobile device 72 and associates it to the guest user. In one embodiment, the server 74 provides a temporary access to the host mobile device 72.

It should be understood that any adequate method for allowing the guest user to identify may be used. For example, the guest user may identify through a login service such as Open ID, OAuth, Google's OpenID Connect, iTunes Connect, Facebook Connect, Extensible Messaging and Presence Protocol (XMPP), or the like.

In one embodiment, an access token is generated and stored along with other metadata such as a token expiry time when the guest user is provided with a temporary access for s predetermined period of time. In this case, the token expiry time is indicative of the predetermined period of time.

In one embodiment, the access token is stored in the application storage space provided by the phone's operating system. In another embodiment, the access token is simply stored in memory. In a further embodiment, the access token is stored on the server 74.

In an embodiment in which a token is generated and stored on the host mobile device 72, all requests to the server are made along with the access token to verify that the data is authorized for viewing by the user requesting it.

In one embodiment, the guest user inputs his username and password and a request for authentication is made to the server 72 and once approved, a security certificate/authentication token is returned to the solution and permits the user to login.

In one embodiment, the access token or the security certificate/authentication token is temporary. An expiry time is associated with the access token or the security certificate/authentication token.

Upon successful identification, the server 72 downloads at least part of the guest account data on the host mobile device 74, at step 92. The guest account data sent from the server 74 to the host mobile device 72 may comprise contact information data, text message information data, phone call information data, and/or the like. The guest account data is temporarily stored on an erasable memory of the host mobile device 72, at step 94, in order to be deleted upon logoff of the guest user.

In one embodiment, a sandbox is created for the guest user on the host mobile device 72 and all information related to the guest user is stored in the sandbox. The sand box represents a space on the host mobile device 72 to be used exclusively for the data of the guest user and ensures that the guest user information does not interfere with the hosts local information. A sandbox is an environment that isolates a guest user's information from the hosts repository, in the context of software development including server, web and mobile development. Sandboxing protects "hosts" local database and their data. The sandbox replicates at least the minimal functionality needed to accurately run the services needed by the guest user.

It should be understood that any adequate method fir creating a sandbox may be used. For example, a temporary database is created using method such as Sybase Control Center Administration Console, SQL Server TempDB, or the like. The TempDB system database for SQL is a global resource that is available to all users connected to the instance of SQL Server and is used to hold the Temporary user objects that are explicitly created, such as: global or local temporary tables, temporary stored procedures, table variables, or updates. In another example, an In-memory database is used to create the sandbox space for the guest user. In a further example, the Web browser cache memory is used to create the sandbox and store the guest user information.

Once the sandbox has been created, the guest user information downloaded from the server 74 is stored in the sandbox, and the guest user is allowed to use the host mobile device, at step 96.

It should be understood that the guest user may use the host mobile device in a manner similar to the use of is own mobile device, i.e. the guest user may access information about his contacts, make and receive phone calls, transmit and receive text messages, and/or the like.

The above-described method for receiving and transmitting text messages via database synchronization is used by the host mobile device so that the text message pan of the host user is not affected by the transmission and reception of text messages by the guest user while using the host mobile device.

When a text message is sent to the guest user, i.e., to the phone number associated with the mobile device of the guest user, the server 74 receives the text message intended to the guest user and retrieves the host phone number associated with the host mobile device 72. The server 74 then transmits the text message to the host mobile device 72 using the above-described database synchronization method. In one embodiment, the server 72 may further send the text message to the guest mobile device.

When the guest user sends a text message to a given contact, the text message is transmitted from the host mobile device 72 to the server 74 via the above-described database synchronization method. Upon reception of the text message, the server 74 changes the phone number associated with the text message from the phone number of the host mobile device 72 to the phone number of the guest user so that the text message appears to have been sent from the guest user mobile device.

In one embodiment, when a person calls the guest user, the server 72 receives the call, retrieves the temporary phone number associated with the guest user, i.e. the phone number associated with the host mobile device, and creates a Voice over IP (VoIP) connection with the host mobile device 72.

In one embodiment, when the guest user calls a person using the host mobile device 72, the host mobile device 72 creates a VoIP connection with the server 74 and the server 74 optionally modifies the phone number associated with the call from the host phone number to the guest phone number using any adequate method such as a call spoofing method and creates a connection with the recipient of the call. It should be understood that server 74 may modify the phone number associated with the call from the host phone number to a given phone number that is different from the guest phone number. It should also be understood the host phone number associated with the call may not be changed.

In one embodiment, when the guest user calls a person using the host mobile device 72, the host mobile device 72 creates a WebRTC connection with the server 74 and the server 74 optionally modifies the phone number associated with the call from the host phone number to the guest phone number using any adequate method such as a call spoofing method and creates a connection with the recipient of the call. It should be understood that server 74 may modify the phone number associated with the call from the host phone number to a given phone number that is different from the guest phone number. It should also be understood the host phone number associated with the call may not be changed.

In one embodiment, the host user profile is suspended while the guest user uses the host mobile device 72 and all notifications and updates are suppressed until the guest temporary login ends.

In another embodiment, the host user profile remains active while the guest user uses the host mobile device. However, the host user profile is not accessible once the guest temporary logins and the guest user is locked only to the service interface. Upon logout of the guest, the host mobile device 72 is locked until the host users opens it again using its lock password.

In one embodiment of a real-time communication application, the solution can open a socket to the server and check and push data updates to the servers.

In another embodiment, the real-time communication service occurs with Extensible Messaging and Presence Protocol (XMPP) which is a spoken language between a client and server for messaging and is independent of implementation languages of client and server. The core of XMPP is the exchange of small, structured chunks of information (in XML). Like Hypertext transfer Protocol (HTTP), XMPP is a client-server protocol, but it differs from by allowing either side to send data to the other asynchronously. XMPP connections are long lived, and data is pushed instead of pulled. This server facilitates instant message transfer between two or many users at any given second.

In one embodiment, a message containing text, a video, an image and/or the like that is intended to a recipient is sent to the server 74 and the server 74 cheeks if the recipient of the message is available. If yes, then the message is forwarded to the recipient. If not, the message is stored until the recipient connects to the server 74. The recipient confirms he received the message by alerting the server 74 and the recipient confirms he read the message also by alerting the server.

In another embodiment, the real-time messaging service uses the TCP-IP protocol. In this case, data is sent to the recipient and accepted by the recipient. A confirmation is then sent by the recipient.

In one embodiment, Internet relay chat (IRC) is used. IRC enables users to connect to a server using a software program or web service and communicate with each other live. For example, the Computer Hope chat room uses an IRC server to allow its users to talk and ask computer questions live. IRC is an open protocol that uses TCP and, optionally, TLS. An IRC server can connect to other IRC servers to expand the IRC network. Users access IRC networks by connecting a client to a server, with a line-based structure. Clients send single-line messages to the server, receive replies to those messages and receive copies of some messages sent by other clients.

In a further embodiment, the real-time communication service uses Web Real-Time Communication (WebRTC) to create a peer-to-peer connection. WebRTC provides browsers and mobile applications with Real-Time Communications (RTC) capabilities via simple application programing interfaces (APIs).

In still another embodiment, the real-time communications service occurs through a persistent connection to the Apple Push Notification (APN) servers if it is elected to use iMessage, iCloud, Notifications or other push services. From there, the host mobile device 72 checks in with the server anytime it has a network connection and listens for messages that the server wishes to push. Furthermore, iOS then registers which applications on the host mobile device 72 should get specific messages. All the messages pass through the notification center system in case they have elected to be posted to specific places such as the lock screen, the notification tray or just passed off to the end application for each message as appropriate.

In still a further embodiment, the real-time communications service uses the Facebook SDK or share directly through Intents. Using the SDK provides an API and handles edge cases such as different versions of Messenger. Content may also be shared through intent without using the SDK. Messenger supports various mime types:

Other examples implementations of real-time communications service comprise the following signalling approaches: WebSockets, XHR and other Comet options, SIP over WebSockets, XMPP/Jingle, WebRTC's Data Channel, and WebRTC works by connecting two browsers through the RTCPeerConnection Referring back to FIG. 4, the guest user is logged out at step 98. All guest account data is then deleted/erased from the host mobile device 72, thereby leaving no trace of the guest user data on the host device.

In one embodiment, the guest user logs off himself. In another embodiment, the guest user is logged off automatically after being connected for a given predefined period of time.

In one embodiment, by using a web browser, the system 70 can benefit from the security of the browser and limit the information on the host mobile device 72. Upon log-out, the guest user information is cleared from the cache memory.

In another embodiment, after log-out of the guest user, all guest user data is deleted through a Truncate and/or Delete statement to empty a table completely and/or delete all rows.

In a further embodiment, all guest data is deleted through command to clear the in-memory data In one embodiment, while using the host mobile device, the guest may only send and receive text messages via database synchronization when the host mobile device is connected to the server via a data connection so that the transmission or reception of text messages by the guest does not affect the text message plan of the owner of the mobile device.

In one embodiment, the west accesses the text message service via the additional application which generates an interface through which the guest may access, write, send, receive, and/or delete text messages.

In order to allow for temporary login, the mobile device and/or the server locks the owner's data while another user, i.e. the guest, is logged in so that the guest may not access the owner's data. It should be understood that the owner's data keep getting synchronized in all of his databases while the guest is using his mobile device. The logged-in guest gets his communications data (call logs, contacts, text messages) synchronized to the owner mobile device. At this point, the guest can use the owner device as if it was his own.

Once installed on the owner mobile device, the additional application does not allow for logging out of the guest primary device, effectively tying the user to the device. This may necessary in the case a valid phone number is required for every registered user, and the subscriber identity module SIM) card is used to send outbound text messages to classic GSM networks endpoints.

In one embodiment, the present system does not prevent the owner from receiving calls and text messages which get synchronized to his mobile device and then pushed to the owners other connected devices. In other words, the owner can use the full feature set of his mobile device from a secondary device while another user as a guest is using his primary device, i.e. his mobile device.

Figure 5:
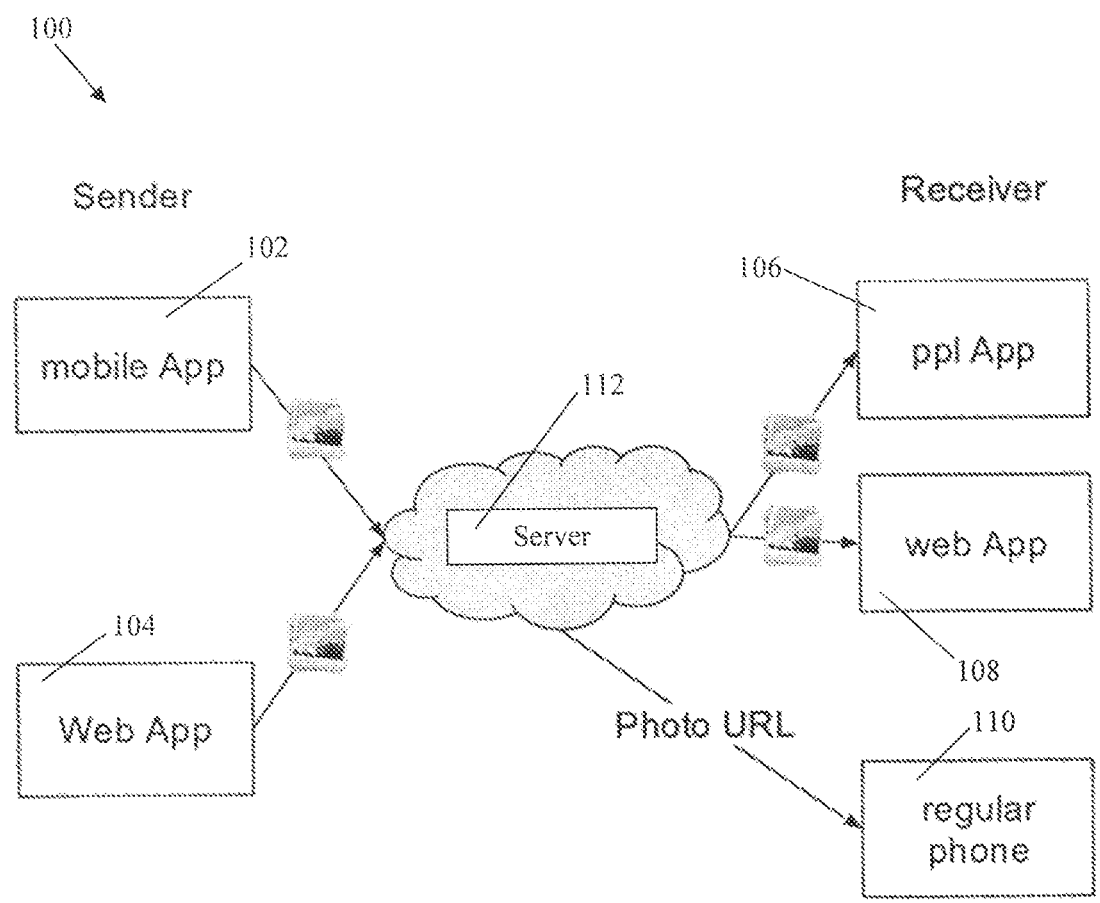
FIG. 5 is a block diagram illustrating a system for transmitting multimedia content message, in accordance with an embodiment.

FIG. 5 illustrates an embodiment of a system 100 for transmitting multimedia content from a sender to a receiver. Multimedia content may comprise text, audio, still images, animation, video, and/or interactivity content.

In one embodiment, the multimedia content may be transmitted as a Multimedia Messaging Service (MMS) message. MMS is a heavily used feature by smartphone users as it enhances the communication experience with multimedia content such as photos or videos. Other over the top messaging systems provide for sharing of photos and videos as well, but they do not intemperate with MMS.

The system 100 enables users to send multimedia content messages from a sender device to a receiver device. The sender device may be a primary device provided with the above-described additional application such as a mobile device 102, or a secondary device provided with the additional application such as a non-mobile device 104. The receiver device may be a primary device provided with the additional application installed thereon such as a mobile device 106, a secondary device provided with the web or additional application stored thereon such as a non-mobile device 108, or a usual GSM mobile device 110 that is not provided with the additional application.

When the sender sends a multimedia content message from the mobile device 102 or the non-mobile device 104, the server 112 and the device 102, 104 synchronize their respective database as described above so that the multimedia content message be transmitted to the server 112. The multimedia content message is then stored on the server 112. The server 112 is adapted to determine whether the receiver device is provided with the additional application. If the receiver device is a mobile device 106 or a non-mobile device 108 provided with the additional application and connected to the server 112 via a data connection, then the server 112 and the device 106, 108 synchronize their respective database as described above so that the multimedia content message be transmitted to the receiver device 106, 108. If the receiver device is not provided with the additional application, then the server sends a text message to the receiver device 110 and the text message comprises a uniform resource locator (URL) pointing at the multimedia content stored on the server 112. The user of the receiver may then wait to be connected to the server 112 via a data connection in order to access the multimedia content.

In one embodiment, if the receiver device 106, 108 provided the additional application is not connected to the server 112 via a data connection, then the server 112 may send a text message comprising the URL pointing at the multimedia content stored on the server 112. When the receiver device 106, 108 will be connected to the server via a data connection, the user of the receiver device 106, 108 may access to the multimedia content stored on the server 112 by selecting the URL. The user may then download the multimedia content by synchronization of the databases of the server 112 and the receiver device 106, 108.

In an embodiment in which the receiver user is provided with a mobile device 106 having the additional application installed or a secondary device 108 having a web application installed thereon, a multimedia message containing multimedia content such as an image is first transmitted and saved on the server 112 via databases synchronization and then delivered to the receiver device 106, 108 via a data connection. This method may save the receiver user expensive MMS carrier charges since the multimedia content is delivered without sending or receiving an MMS message.

In an embodiment in Which the receiver user is provided with usual GSM mobile device 110 on which none of the additional and web applications is installed, the multimedia content received from the sender device 102, 104 is stored on the server 112 for later access by the receiver user, and a short URL link pointing to the multimedia content is generated and inserted into a text message such an SMS message that is sent by the server 112 to the receiver device 110 on the GSM network. The receiver user may subsequently click on the URL link contained in the received text message to be directed to the multimedia content stored on the server 112 via the web browser of the GSM mobile device 110.

In one embodiment, the text message containing the URL link can be sent either from the sender's primary device 102 as a regular SMS message for example via database synchronization. Alternatively, it may be delivered via a third party phone number to the regular GSM device 110. In this case, all receiver users would receive the text message from a same phone number and would not be able to reply directly. The later may an adequate option when the text message is sent from a sender device 104 having a web application installed thereon, especially in the case where the primary device 102 is not available (e.g.: battery died). In one embodiment, all receiver users receive the text message from a same phone number and would be able to reply directly based upon an internal route back system to trace the initial sender account.

The embodiments of the invention described above are intended to be exemplary only. The scope of the invention is therefore intended to be limited solely by the scope of the appended claims.

We claim:

1. A system for transmitting a text message, comprising:
    a user device provided with a first processing unit, a first communication unit, a first storing unit, a display unit, and an input unit, the first storing unit having a first database of text messages stored thereon, the first processing unit being configured for allowing a user to at least one of receive, read, write, and send text messages; and
    a server provided with a second processing unit, a second communication unit, a second storing unit, the second storing unit having a second database of text messages stored thereon;
    wherein the first processing unit is configured to determine whether a first type of data connection is currently available to the user device;
    wherein a given one of the first processing unit and the second processing unit is adapted to synchronize the first and second databases in response to a determination that the first type of data connection is currently available to the user device so that the text message contained in a given one of the first and second databases be copied in the other one the first and second databases in order to transmit the text message from the given one of the first and second databases to the other one the first and second databases; and
    wherein the first processing unit is configured to transmit an outgoing text message to a recipient user device over a second type of data connection in response to a determination that the first type of data connection is not currently available to the user device.

2. The system of claim 1, wherein to synchronize the first and second databases, the given one of the first processing unit and the second processing unit is configured to:
    compare a content of the first database to a content of the second database;
    determine that the text message is contained in the given one of the first and second databases and absent from the other one of the first and second databases; and
    copy the text message to the other one of the first and second databases, in order to synchronize the first and second databases.

3. The system of claim 2, wherein the given one of the first processing unit and the second processing unit is the first processing unit of the user device; and
    wherein the server is adapted to transmit the content of the second database to the user device.

4. The system of claim 3, wherein the first processing unit of the user device is configured to:
    compare the content of the first database to the content of the second database;
    determine that the text message is contained in the second database and absent from the first database; and
    copy the text message into the first database, in order to synchronize the first and second databases.

5. The system of claim 3, wherein the first processing unit of the user device is configured to:
    compare the content of the first database to the content of the second database;
    determine that the text message is contained in the first database and absent from the second database; and
    transmit the text message to the server to be copied in the second database.

6. The system of claim 3, wherein the server is adapted to transmit only a part of the content of the second database to the user device.

7. The system of claim 6, wherein the server is adapted to transmit content of the second database that has been added or modified since a previous synchronization.

8. The system of claim 2, wherein the given one of the first processing unit and the second processing unit is the second processing unit of the server;
    wherein the user device is adapted to transmit the content of the first database to the user device; and
    wherein the second processing unit of the server is configured to:
    compare the content of the first database to the content of the second database;
    determine that the text message is contained in the first database and absent from the second database; and
    copy the text message into the second database in order to synchronize the first and second databases.

9. The system of claim 2, wherein the given one of the first processing unit and the second processing unit is the second processing unit of the server;
    wherein the user device is adapted to transmit the content of the first database to the user device; and
    wherein the second processing unit of the server is configured to:
    compare the content of the first database to the content of the second database;
    determine that the text message is contained in the second database and absent from the first database; and
    transmit the text message to the user device to be copied in the first database in order to synchronize the first and second databases.

10. A first device for text message communication comprising at least:
    a processing unit, a communication unit for transmitting and receiving data, and a storing unit, the storing unit having a first database of text messages stored thereon, the processing unit being adapted to:
- determine whether a first type of data connection is currently available to the first device for transmission of text messages to a second device;
- synchronize the first database with a second database stored on the second device in response to a determination that the first type of data connection is currently available to the first device so that the text message contained in a given one of the first and second databases be copied in the other one the first and second databases in order to transmit the text message from the given one of the first and second databases to the other one the first and second databases; and
- transmit, over a second type of data connection, an outgoing text message to a recipient user device, different from the second device, in response to a determination that the first type of data connection is not currently available to the first device.

11. A computer-implemented method for text message communication, the method comprising use a processing unit belonging to a first device that further comprises at least a communication unit for transmitting and receiving data and a storing unit having a first database of text messages stored thereon, wherein the computer-implemented method comprises:
- determining whether a first type of data connection is currently available between the first device and a second device, wherein the second device includes a second database of text messages;
- synchronizing the first database with the second database of text messages in response to a determination that the first type of data connection is currently available between the first device and the second device so that a text message contained in a given one of the first and second databases be copied in the other one the first and second databases in order to transmit the text message from the given one of the first and second databases to the other one the first and second databases; and
- transmitting, over a second type of data connection, an outgoing text message to a recipient user device, different from the second device, in response to a determination that the first type of data connection is not currently available between the first device and the second device.

12. The computer-implemented method of claim 11, wherein said synchronizing comprises:
- comparing a content of the first database to a content of the second database;
- determining that the text message is contained in the given one of the first and second databases and absent from the other one of the first and second databases; and
- copying the text message to the other one of the first and second databases.

13. The system of claim 1, wherein the first processing unit is configured to transmit the outgoing text message to the recipient user device via a native Short Message Service (SMS) of the user device.

14. The system of claim 1, wherein one of the first type of data connection and the second type of data connection comprises a Wi-Fi connection between the user device and the server.

15. The system of claim 1, wherein the text messages comprise messages structured for transmission via a native text messaging application of the user device.

16. The first device of claim 10, wherein the first processing unit is adapted to transmit the outgoing text message to the recipient user device via a native Short Message Service (SMS) of the first device.

17. The first device of claim 10, wherein one of the first type of data connection and the second type of data connection comprises a Wi-Fi connection between the first device and the second device.

18. The first device of claim 10, wherein the text messages comprise messages structured for transmission via a native text messaging application of the first device.

19. The computer-implemented method of claim 11, wherein the transmitting the outgoing text message to the recipient user device comprises transmitting the outgoing text message to the recipient user device via a native Short Message Service (SMS) of the first device.

20. The computer-implemented method of claim 11, wherein one of the first type of data connection and the second type of data connection comprises a Wi-Fi connection between the first device and the second device.

21. The computer-implemented method of claim 11, wherein the text messages comprise messages structured for transmission via a native text messaging application of the first device.

* * * * *